Feb. 19, 1946. C. F. VAN GILDER ET AL 2,395,086
PROCESS OF FINISHING ISOBUTYLENE POLYMERS
Filed Oct. 11, 1941
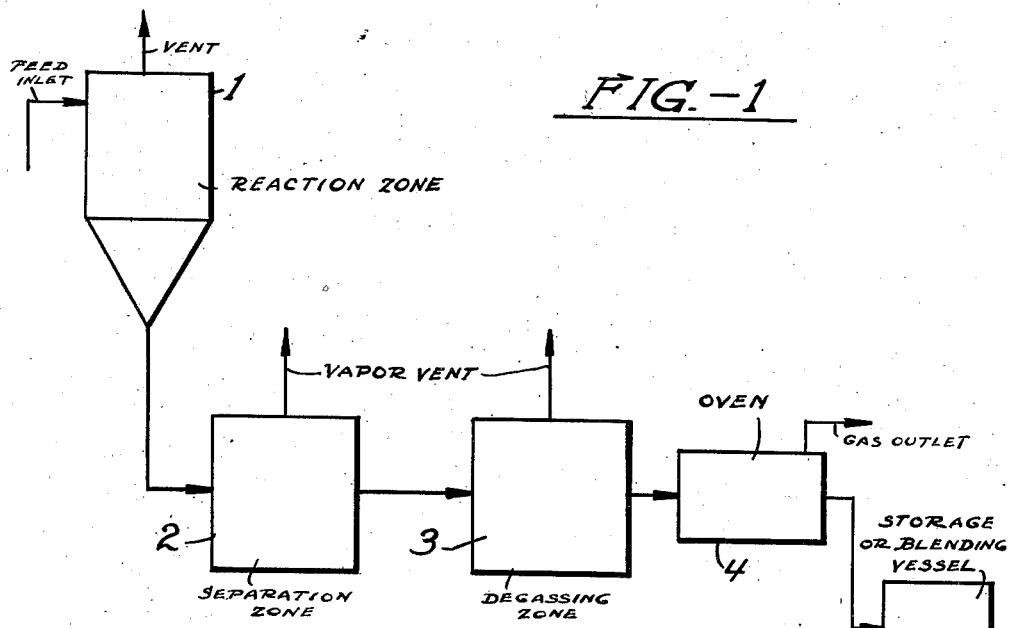
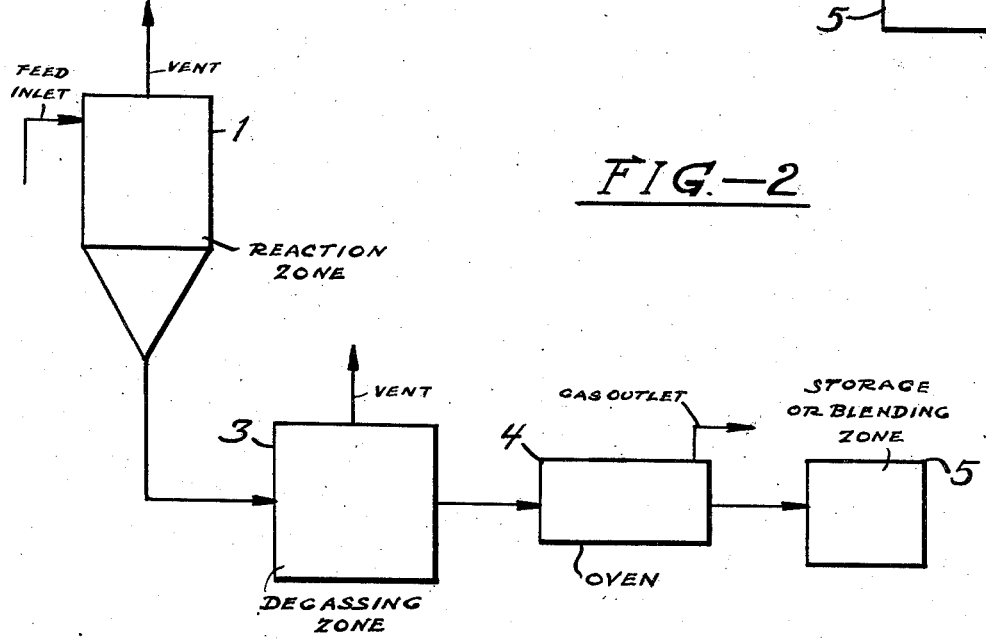
Carll T. Van Gilder
Hector C. Evans Inventors
By T. Young Attorney Patented Feb. 19, 1946

2,395,086

UNITED STATES PATENT OFFICE 2,395,086

PROCESS OF FINISHING ISOBUTYLENE POLYMERS

Carll F. Van Gilder, Roselle, and Hector C. Evans, Cranford, N. J., assignors, by mesne assignments, to Jasco, Incorporated, a corporation of Louisiana Application October 11, 1941, Serial No. 414,622

7 Claims. (Cl. 252—59)

This invention relates to a method of treating highly polymerized isobutylene to obtain a product of satisfactory purity and desirable physical characteristics, particularly for utilization as a blending agent.

Processes have been developed for polymerizing isobutylene to plastic and solid rubber-like materials having a number of important commercial uses. These materials, for convenience termed polybutenes, are made by polymerizing practically pure isobutylene at carefully controlled temperatures of the order of −40° C. to −100° C. and lower, with boron fluoride as the preferred catalyst in a suitable reaction medium, such as liquefied normally gaseous, non-reactive, organic compounds, e. g., liquefied ethane, liquefied ethylene, very low boiling alkyl halides, e. g., methyl chloride, and combinations of such compounds.

Physical characteristics of the isobutylene polymers are governed by the extent of polymerization or molecular weight of the polymers. For a number of purposes, the isobutylene polymer products are required to have a certain toughness, elasticity, and freedom from tackiness. These polymers have molecular weights of the order of 60,000 to 200,000, or higher, and are distinguishable from the lower molecular weight polymers which are soft plastics and tacky, as well as from the still lower molecular weight polymers having molecular weights below 30,000 which are sticky, viscous liquids.

Chemically, the isobutylene polymers are branched long chain molecules with a negligible degree of unsaturation, the unsaturation diminishing with increase in molecular weight. By virtue of their low degree of unsaturation and other structural characteristics, these polymers have an exceptional inertness, but they are broken down by heat at elevated temperatures and by attrition from mechanical working.

Following the synthesis of the polybutenes, including those having sufficiently high molecular weights to be distinguishable by characteristics of toughness and elasticity, it is usually essential to purify them, particularly to remove the entrapped catalyst. The catalyst tends to remain in the polymer at the end of the reaction after the polymer is separated from the reaction mixture. Ordinarily, the catalyst thus remaining in the polymer imparts a fluorine content above 0.1% by weight, and in concentrations of this order, makes the product unsuitable for general commercial use, making it unstable and corrosive.

In the past, elimination of the catalyst impurities was carried out regularly by neutralization and washing of the polymers. Although this kind of procedure is suitable for the relatively low molecular weight polymers, which are viscous liquids or soft plastic materials, it has been found to be less satisfactory for the higher molecular weight polymers which are tough, elastic, and rubbery in nature.

Neutralization and washing of the higher molecular weight polymers requires drastic mechanical kneading, large amounts of the treating agents, and considerable time. At the end of this kind of procedure, unless great precautions are taken, the polymer is greatly degraded in color, in physical strength, and quality thru the mechanical working. At times, it has been observed that the neutralization step with mechanical means has reduced the average molecular weight of the polymer over 20,000. Furthermore, the kneaded polymer is left in a compact form which makes the polymer very difficult to blend with other materials.

An object of the present invention is to provide a more efficient purification treatment for the isobutylene polymers identified as tough, elastic solids which give the described difficulties in a neutralization and washing purification treatment. The finishing treatment of the present invention is a simple procedure with high efficiency, provided due regard is given to the condition of the polymer subjected to the treatment and to the conditions of the operation, and makes the finished product exceedingly better adapted for blending with solvents of all types.

An initial measure taken in the practice of this invention is to ensure that the polymer will respond properly to the treatment; hence, an elastic solid isobutylene polymer formed in a highly volatile reaction medium, such as liquefied normally gaseous organic compounds that are non-reactive in the polymerization, is preferably separated at low temperatures from the liquid reaction mixture in apparently dry condition yet containing some of the catalyst and substantial amounts of occluded or entrapped liquefied gas. When the thus recovered polymer is heated in a dry atmosphere to moderate temperatures, preferably at a rapid rate, the entrapped liquefied gas is caused to expand and become explosively disengaged, leaving the polymer in a whitish porous, and everted form, somewhat similar to popcorn-like or tenuous spongy masses. In this form the polymer has a very low apparent density, from less than 0.1 to about 0.5, although its normal density is of the order of 0.9.

After being transformed into the dry porous and everted condition, the polymer is then subjected to a controlled heat purification treatment as quickly as possible to avoid condensation of moisture on the polymer and prevent hydrolysis of the volatile entrapped catalyst to non-volatile compounds.

For the heat treatment, any conventional type of drying oven may be used. The oven may be of the type having stationary drying trays for batch treatment, or one having moving conveyance means for continuous treatment. Preferably, the oven should be equipped with means for obtaining a forced draft circulation of a dry gas thru the oven, or with means for creating a vacuum therein to expedite the treatment.

It has been found that the desired purification results are obtained by exposing the porous polymer to dry heat at temperatures in the range of about 80° C. to 160° C., and more preferably, in the range of 90° C. to 140° C. for as short a time as necessary.

Optimum results, with vacuum or a circulated dry inert gas, such as carbon dioxide, nitrogen, or clean, dry flue gas to aid in expelling gases from the interior of the oven at a faster rate, are obtained within a short period of about 10 to 60 minutes at temperatures ranging from about 120° C. to 150° C., the time being shortened as the temperature is increased within proper limits to avoid excessive breakdown of the polymer.

Without vacuum or a circulated dry inert gas, the treatment has to be prolonged, generally, to a period of about 60–180 minutes, and the temperature of treatment is preferably maintained within the range of about 90° C. to 120° C.

Good results are obtained with dry air circulated thru the oven at temperatures preferably restricted to the range of about 90° C. to 130° C. or with dry (superheated steam), preferably at 110° C. to 130° C., these gaseous substances being more economical than gases like carbon dioxide for shortening the treatment but not as efficient.

Also, for the purpose of expediting the treatment more economically, it may be effected under a combination of conditions, as, for example, partly with and partly without a circulated gas or vacuum.

The total time of the heat purification treatment is varied somewhat with the particular polymer product treated as well as by the conditions. The time required is somewhat proportional to the amount of the catalyst to be eliminated. As the molecular weight of the polymer is increased, both the temperature of treatment and the rate of catalyst removal may be increased. For example, polybutenes having molecular weights above 100,000 are more readily treated without vacuum or a circulated gas at temperatures in the range of 90 to 120° C. than are polybutenes having molecular weights of 60,000 to 100,000.

When the heat purification treatment is completed, the fluorine contents of the polymer are reduced to well below 0.1% and satisfactorily below tolerance limits of 0.005%, without the polymer undergoing any serious impairment of color or degradation in its physical qualities.

In the accompanying drawing is shown schematically flow diagrams of the procedure subject to modifications as indicated.

Referring to the flow diagram of Figure 1, the steps indicated therein are: The reaction mixture containing the polymer product having the desired molecular weight is withdrawn from the reaction zone 1, whence it is passed to a polymer recovery zone in separator 2 for separating substantially all the volatile materials from the solid polymer except those entrapped at the boiling points of these materials. The solid polymer is then transferred to a stripping or degassing zone 3, wherein it is heated to a temperature, e. g., of the order of about −40° C. to +40° C., sufficient to cause rapid expansion and disengagement of the entrapped liquefied gas contained by the polymer. From the stripper the degased polymer in a porous form is placed immediately, or as soon as possible, into the oven 4 for the heat purification treatment, and finally the finished polymer is sent to a storage or blending zone 5.

Since in continuous operations the solid polymer may be preferably extruded or removed from the reactor separated from volatile materials of the reaction mixture, such as the refrigerating diluent and any unreacted isobutylene except for such liquefied normally gaseous compounds and catalyst entrapped, the thus separated solid polymer may be transferred directly to the degassing or stripping zone 3 for expanding and disengaging the entrapped liquefied normally gaseous compounds. This alternative procedure is indicated in the flow diagram of Fig. 2.

The solid polymer may be transferred manually, or by any suitable conveying means, as, for example, screw conveyors, from one unit to another. Furthermore, a combination of steps may be carried out in some of the units, for example, after separation of the solid polymer from the reactor, the solid polymer may be degassed and then heat treated in the oven, or the solid polymer may be degassed in a reactor in a batch operation and transferred therefrom to the oven for the heat purification treatment. The units may be equipped with a suitable external heating means to apply heat needed for the degassing and heat treating steps without introducing moisture. In the oven the heating may be accomplished by the preheating of the circulated gas, by heat exchange with external heating media, by electricity, or by a combination of these means.

As previously mentioned, it is desirable to bring about the purification as rapidly as possible after the synthesis of the polymers, for with any delay while the entrapped catalyst is present and the polymer is heated to temperatures substantially above the extremely low reaction temperatures, there is more possibility of deterioration. Hence, it is desirable to accomplish particularly the degassing step and the oven treatment in short periods and in rapid succession, while taking precautions not to overheat and not to allow moisture condensation on the polymer.

The polymerization reaction temperatures are satisfactorily maintained, automatically and constantly, at approximately the boiling temperatures of the liquefied normally gaseous compounds which act as non-reactive media or refrigerating diluents in the reaction zone while vapors of these compounds are withdrawn from the reaction zone at a suitable rate to maintain a desired pressure and temperature. For example, with liquefied ethylene as the reaction medium under a pressure of about 1 atmosphere, the reaction temperature is maintained below about −100° C. Accordingly, the solid polymer is separated very readily from these liquefied normally gaseous compounds except for the part entrapped within the solid polymer by evaporation at low temperatures near the boiling points of these compounds, i. e., in the range below about −40° C.

Various phases of the invention are demonstrated by the following illustrative examples:

Isobutylene polymers having molecular weights ranging above 60,000 were prepared in accordance with known methods as described. The high molecular weight polymers were separated from the reaction mixture and stripped of entrapped liquefied gas in the manner described to thereby bring the polymer into a whitish, light porous and everted condition preliminary to the purification treatment.

Samples of the porous polymers thus prepared were placed in a stationary-tray drying oven, wherein the temperature was regulated until the conditions adequate for expelling the catalyst were obtained. A number of runs were carried out to test the efficacy of the operation under varied conditions and with different circulating gases. In these tests, molecular weight data was obtained to determine to what extent, if any, the product had undergone degradation in eliminating the catalyst.

Example 1

Using a stationary-tray drying oven, a sample of the porous polymers having an average molecular weight of about 77,000 was heated therein at a temperature of 130° C. with carbon dioxide circulated thru the oven. At intervals during this heat treatment, representative samples of the polymer were removed from the oven for testing to determine the extent of purification and molecular weight. Representative data is summarized in the following table:

| Time, mins. | Fluorine analysis, percent F | Molecular weight |
|---|---|---|
| 0 | 0.127 | 77,000 |
| 10 | 0.091 | |
| 20 | 0.014 | 77,000 |
| 30 | 0.004 | |
| 60 | 0.004 | 76,000 |

Example 2

Treating a separate sample of the initial polymer product described in Example 1 with the modification of heating the polymer for 5 additional minutes without circulating carbon dioxide thru the oven, the following data was obtained:

| Time, mins. | Fluorine analysis, percent F | Molecular weight |
|---|---|---|
| 0 | 0.127 | 77,000 |
| 20 | 0.006 | 75,500 |
| 60 | 0.003 | 69,000 |

Example 3

By treating a porous polymer in the oven without a circulated gas or vacuum, the following results were obtained:

| Time, mins. | Temperature, °C. | Percent fluorine Initial | Percent fluorine Final | Mol. wt. Initial | Mol. wt. Final |
|---|---|---|---|---|---|
| 30 | 30 | 0.12 | 0.006 | 126,500 | 126,000 |

Example 4

Porous polymers of about 70,000 molecular weight were treated in the oven (1) without circulating gas, (2) with circulated dry air, and (3) with superheated steam, and the following results were obtained:

| Treatment | Time, mins. | Temp., °C. | Percent F eliminated | Approximate decrease in mol. wt. |
|---|---|---|---|---|
| No gas circulated | 60 | 120 | 0.154 | 10,000 |
| Air circulated | 30 | 133 | 0.180 | 10,000 |
| Superheated steam | 30 | 138 | 0.129 | 6,000 |

Thus, it was demonstrated that the heat purification treatment is fully effective in reducing the fluorine content to an insignificant trace without adversely affecting the molecular weight of the polymer to any substantial or excessive degree.

To further illustrate the advantages of the present method for finishing the polymer, separate portions of the polymer product were subjected to different finishing treatments, one portion being worked up in accordance with the ordinary procedure of neutralizing and washing in a kneading mixer immediately after separation of the volatile liquids from the polymer, and the other being treated in accordance with the present procedure by degassing to a porous form and heat treating. The product subjected to neutralizing and washing in a kneading mixer had to be treated slowly to avoid having the polymer become excessively compact so that it would not "ball up" in the mixer. The other portion of the product given the heat purification treatment was brought to the same degree of purity but remained in a porous condition.

The same quantity of each of the finished products was then added to identical quantities of a hydrocarbon lubricating oil for blending therewith in a conventional blending apparatus. The time taken for each of the test samples of polymer to properly blend with the solvent lubricating oil was determined thru the effects of the polymers in thickening the oil, since the thickening or viscosity increasing effect of the polymer varies in proportion to the amount of the polymer to completely dissolve in the oil, the molecular weight of the polymer being held constant.

Data on the rate of the solution for each type of treated polymer is summarized in the following table:

| Time elapsed, hrs. | Furol viscosity of solution at 210° F. | |
|---|---|---|
| | Heat purified degassed polymer | Neutralised, washed and kneaded polymer |
| 0 | 4.7 | 4.7 |
| 1.0 | 530.0 | 39.7 |
| 2.0 | 2,604.0 | 44.1 |
| 9.5 | 11,294.0 | 81.4 |

The foregoing data very markedly illustrates how the heat purified polymer is considerably more readily dissolved than the more compact finished polymer, and accordingly, this advantage means a great deal in the saving of time and equipment when the polymer is utilized for the purpose of blending with other materials.

The elastic solid polymers purified to eliminate objectionable catalyst contents and thus finished in a highly porous condition may be readily blended with hydrocarbon lubricating oils of all types, with hydrocarbon fuels, waxes, asphalts, rubber, synthetic or natural, industrial oils, or resins. They may be used in such compositions with admixtures of lower molecular weight polybutenes, stabilizing agents, fillers, solvents, pigments, anti-oxidants, or other types of additives.

This invention is not to be restricted by the specific examples given for the purpose of illustration, for various modifications may be made which come within the spirit and scope of the invention as defined in the appended claims.

We claim:

1. The method of finishing an elastic solid isobutylene polymer having a molecular weight above 60,000 prepared by the low temperature polymerization of an isobutylene-containing, polymerizable material by the application of a Friedel-Crafts catalyst at temperatures ranging from $-40°$ C. to $-100°$ C., which comprises separating said polymer from a liquefied normally gaseous medium of a reaction mixture in which the polymer is formed, except for liquefied gas and boron fluoride catalyst entrapped in the polymer, heating the solid polymer in free space to a temperature within the range between $-40°$ C. and $+40°$ C. at which liquefied gas entrapped in the polymer is disengaged from the polymer so as to evert the polymer into a porous condition, and exposing the thus conditioned polymer kept substantially free from contact with moisture to heat at a temperature in the range of about $80°$ C. to $160°$ C. for a sufficient length of time to expel from the polymer substantially all but an insignificant trace of boron fluoride catalyst and avoid substantial degradation of the polymer.

2. The method as described in claim 1 in which the heating of the polymer in a porous condition to expel the catalyst is carried out in a zone from which gases are rapidly evacuated.

3. The method as described in claim 1, in which the polymer in a porous condition is heated to expel the catalyst in the presence of circulated carbon dioxide.

4. The method as described in claim 1, in which the polymer in a porous condition is heated to a temperature in the range of $120°$ C. to $150°$ C. to expel the catalyst in the presence of a circulated dry inert gas for a period of about 10 to 60 minutes.

5. The method as described in claim 1, in which the polymer in a porous condition is heated to a temperature in the range of about $90°$ C. to $130°$ C. in the presence of moisture-free air.

6. The process of finishing an elastic solid polymer having a molecular weight above 60,000 formed by polymerizing liquefied isobutylene with boron fluoride as the catalyst in a liquefied normally gaseous medium that is non-reactive and undergoes controlled ebullition under the polymerization conditions to maintain the reaction temperature within the range between about $-40°$ C. and $-100°$ C., which comprises separating said liquefied normally gaseous medium from the solid polymer except for a portion of the medium left with some of the catalyst entrapped by the polymer, rapidly heating the polymer in free space to a temperature within the range between $-40°$ C. and $+40°$ C. to expand and disengage said entrapped liquefied medium from the solid polymer so as to leave the solid polymer in a porous form, and further heating the solid polymer in a porous form at a temperature in the range of about $90°$ C. to $150°$ C. for a sufficient length of time to reduce its fluorine content below about 0.005%.

7. The process of preparing a finished isobutylene polymer product prepared by polymerization of an isobutylene-containing liquid at a temperature between $-40°$ C. and $-100°$ C. by the application of boron trifluoride, which comprises separating an elastic solid polybutene having a molecular weight above 60,000 from a liquefied normally gaseous substance in which said polybutene is formed except for a portion of said liquefied substance entrapped with boron fluoride by said polybutene, raising the temperature of said polyisobutylene in free space to a temperature within the range between $-40°$ C. and $+40°$ C. to cause said entrapped liquefied substance to become expanded and disengaged so as to leave the polybutene in a porous condition, heating the porous polybutene at a temperature in the range of about $90°$ C. to $150°$ C. for a sufficient time to expel said entrapped catalyst while maintaining the polybutene in a porous solid condition, and thereafter quickly dissolving said porous solid polyisobutylene with a hydrocarbon lubricating material to obtain the desired finished product.

CARLL F. VAN GILDER.
HECTOR C. EVANS.